United States Patent [19]
Ophir

[11] Patent Number: 4,993,416
[45] Date of Patent: Feb. 19, 1991

[54] SYSTEM FOR ULTRASONIC PAN FOCAL IMAGING AND AXIAL BEAM TRANSLATION

[75] Inventor: Jonathan Ophir, Houston, Tex.

[73] Assignee: Board of Reagents The University of Texas System, Austin, Tex.

[21] Appl. No.: 343,405

[22] Filed: Apr. 25, 1989

[51] Int. Cl.[5] ............................................. A61B 8/00
[52] U.S. Cl. ................................ 128/660.06; 73/599; 128/660.09
[58] Field of Search ...................... 128/660.06, 660.09, 128/660.1; 73/633, 639, 599

[56] References Cited

U.S. PATENT DOCUMENTS

| | | | |
|---|---|---|---|
| 2,946,904 | 7/1960 | Renaut | 310/8.2 |
| 4,177,679 | 12/1979 | Soldner | 73/625 |
| 4,242,913 | 1/1981 | Mezrich et al. | 73/626 |
| 4,287,767 | 9/1981 | Kretz | 128/660.09 X |
| 4,294,119 | 10/1981 | Soldner | 73/625 |
| 4,324,140 | 4/1982 | Auld | 73/602 |
| 4,383,447 | 5/1983 | Kretz | 73/626 |
| 4,389,893 | 6/1983 | Ophir et al. | 73/599 |
| 4,402,223 | 9/1983 | Naumann, Jr. et al. | 73/625 |
| 4,403,509 | 9/1983 | Kretz | 73/625 |
| 4,432,371 | 2/1984 | McAusland | 128/660 |
| 4,452,084 | 6/1984 | Taenzer | 73/609 |
| 4,458,689 | 7/1984 | Sorenson et al. | 128/660 |
| 4,509,524 | 4/1985 | Miwa | 128/660.06 |
| 4,515,017 | 5/1985 | McConaghy | 73/618 |
| 4,534,221 | 8/1985 | Fife et al. | 73/626 |
| 4,543,960 | 10/1985 | Haryi et al. | 128/660 |
| 4,567,895 | 2/1986 | Putzke | 128/660 |

OTHER PUBLICATIONS

*Elimination of Diffraction Error in Acoustic Attenuation Estimation Via Axial Beam Translation, Ultrasonic Imaging*, vol. 10, pp. 139–152 (1988), by Ophir and Mehhta.

Primary Examiner—Francis Jaworski
Attorney, Agent, or Firm—Arnold, White & Durkee

[57] ABSTRACT

The present invention provides a novel method and apparatus which allows concomitant imaging and rapid axial beam translation measurements used to calculate the attenuation characteristics of a target body. The present invention employs an ultrasonic scanner which contains a plurality of matched transducer elements. These elements are staggered on a mechanism which sequentially places each transducer opposite an acoustic window at axially spaced positions along a common axis. The present invention also enables axial beam translation techniques to be adapted to current ultrasonic imaging systems.

19 Claims, 4 Drawing Sheets

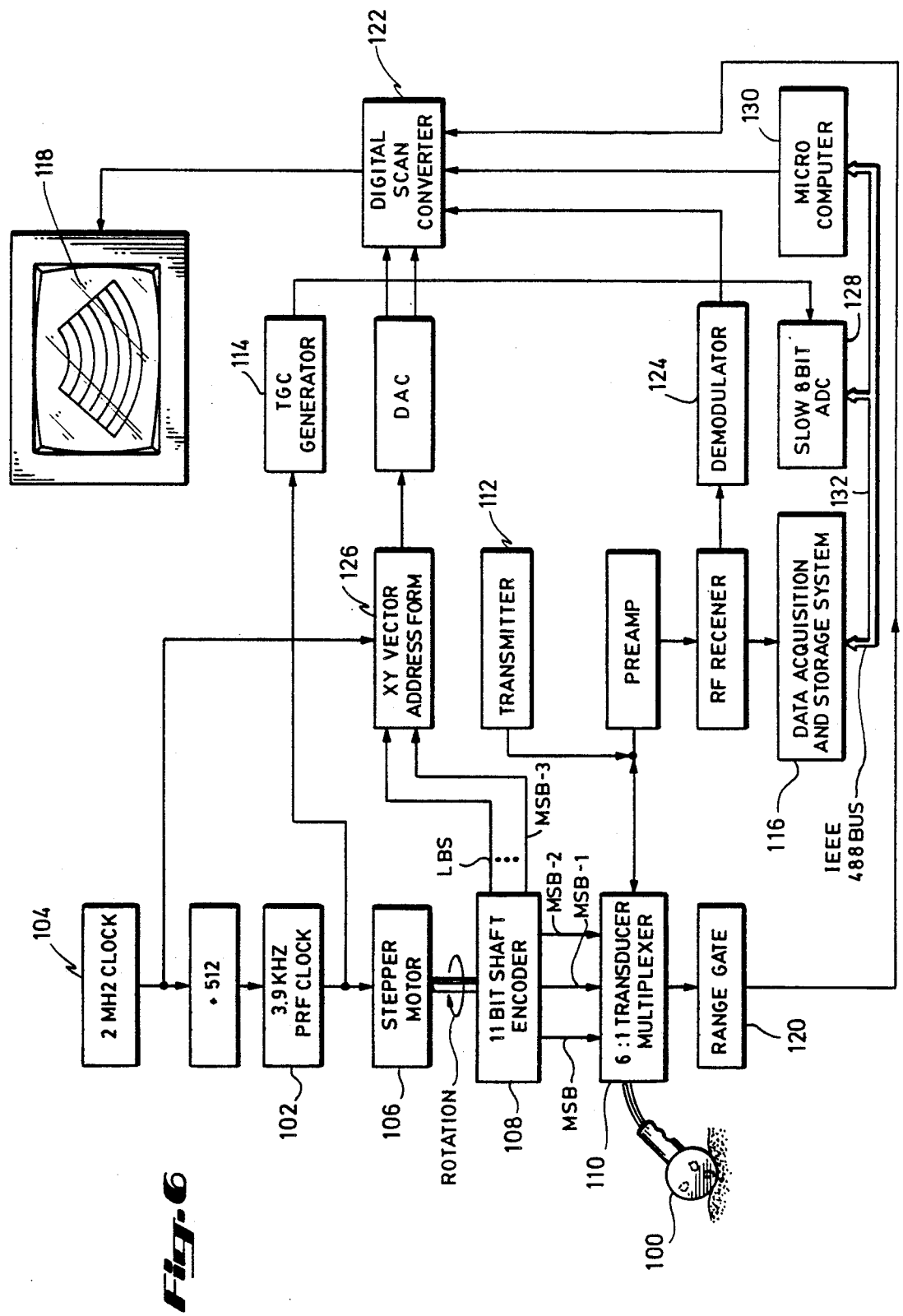

SYSTEM FOR ULTRASONIC PAN FOCAL IMAGING AND AXIAL BEAM TRANSLATION

BACKGROUND OF THE INVENTION

1. Field of the Invention

This invention relates generally to methods and apparatus for performing ultrasonic diagnosis of a target body and more particularly to methods and apparatus for concomitantly acquiring an ultrasonic image and measuring the attenuation characteristics of a target body.

2. Description of Related Art

Traditional ultrasonic diagnosis is performed by transmitting ultrasonic energy into a target body and generating an image from the resulting echo signals in order to survey anatomical structures. A transducer is used to both transmit the ultrasonic energy and to receive the echo signals. During transmission, the transducer converts electrical energy into mechanical vibrations. Acquired echo signals produce mechanical oscillations in the transducer which are reconverted to electrical signals for amplification and recognition.

A human or animal body represents a non-homogenous medium for the propagation of ultrasound energy. Images may be generated from the echo/backscatter signals which are produced as ultrasonic energy propagates through acoustic impedance interfaces and lower-level scatter sites within the target body.

Acoustic impedance changes at boundaries of varying density and/or sound speed within a target body. A portion of the incident ultrasonic beam is reflected at these boundaries. Inhomogeneities within the target medium form lower-level scatter sites which result in additional echo signals. Tissue characterization may be measured from acoustic attenuation and acoustic impedance changes at the boundaries and the scatter sites. A knowledge of the speed of sound in tissue permits the determination of the depth and location of both the interfaces and the echo sites from the measurement of echo travel time. An image may be generated from this information by modulating the intensity of pixels on a display in proportion to the intensity of echoes from corresponding points in the target.

In recent years, much effort has been expended to obtain clinically useful data from the several physical processes involved in echo production. In particular, techniques for measuring the attenuation of ultrasonic energy as it propagates through a soft tissue have been pursued. As ultrasonic energy propagates through tissue, some of the energy is absorbed and some is scattered out of the acoustic pathway. These two mechanisms result in a net loss of signal power—i.e., acoustic attenuation. Acoustic attenuation has a near linear frequency dependence and is generally characterized as signal power loss in decibels per centimeter of propagation per MHz. When attenuation is plotted as a function of frequency, a near linear relationship is defined. This function—the attenuation coefficient—varies with the acoustic characteristics of particular tissues. In soft tissues it has been shown that there is some correlation between attenuation characteristics and tissue pathology. For example, a healthy liver will have a different attenuation coefficient than a cirrhotic liver. Thus, a technique for accurate measurement of acoustic attenuation characteristics would be clinically valuable.

Several prior art techniques have been developed to measure the attenuation characteristics of soft tissue. One prior art technique for measuring ultrasound attenuation requires that the target body be placed between separate transmitting and receiving transducers. This technique, however, is impractical in clinical settings, since transmission through most sections of a target body is not possible.

A second prior art technique known as the "substitution method" utilizes a known reflector to return echoes to a common transmitting/receiving transducer. A tissue specimen is placed between the transducer and the reflector, and the resulting decrease in echo signal power is used to determine the attenuation characteristics of the tissue. This technique, however, also has clinical limitations, since known reflectors cannot be inserted into human target bodies.

Both of the above prior art techniques are further limited by the measurement of attenuation based upon the entire path of the propagating energy. As such, they are not entirely suitable for measuring attenuation of limited regions of interest within a target body.

Knowledge of the ultrasound attenuation characteristics within limited regions of a human or other animal target body has specific value for clinical diagnostic purposes. As discussed above, for example, diseased livers have different attenuation characteristics from healthy ones. A technique known as the "spectral difference" method has been proposed, whereby echo signals from varying depths in the target are acquired and converted to spectral signals using known Fourier transform algorithms. See Roman Kuc, "Estimating Acoustic Attenuation from Reflected Ultrasonic Signals Comparison of Spectral Shift and Spectral Difference Approaches", IEEE Transactions on Acoustics, Speech and Signal Processing, ASSP-32, 1-6, (1984). A knowledge of the speed of sound in the target allows the ultrasonic echo sequence to be broken up into temporal spectral windows which correspond to varying depths in the target. The log-spectral differences between windows are computed, and the attenuation coefficient is derived. However, attenuation estimations using this technique tend to suffer from bias errors. These errors are attributable to a variety of phenomena, including the inherent differences in pulse-echo impulse response of a transducer at various distances from the transducer aperture.

One method for eliminating the effects of these beam diffraction errors has used Inverse Diffraction Filtering ("IDF") techniques to develop a beam correction factor. IDF techniques utilize plane reflectors or tissue mimicking phantoms to measure the differences in pulse-echo impulse response of a transducer as a function of range to derive a beam correction function. However, these beam correction functions are not entirely satisfactory in clinical settings since pulse-echo beam characteristics may vary in different tissues, particularly in unknown tissues. See Robinson, et al., "Beam Pattern (Diffraction) Correction for Ultrasonic Attenuation Measurements", Ultrasonic Imaging, Vol. 6 No. 3, 293–303 (1984). Thus, the IDF correction factor to be applied to echo signals varies according to the type of (generally unknown) tissue being examined.

A second method for elimination of diffraction errors known as Axial Beam Translation ("ABT") has been successful in rendering unbiased estimations of attenuation in unknown targets. See Ophir and Mehta, "Elimination of Diffraction Error in Acoustic Attenuation Estimation Via Axial Beam Translation", Ultrasonic Imaging 10, 139-152 (1988) which is incorporated by reference herein. However, initial ABT techniques have tended to be problematic in clinical settings due to the requirement for axial translation of the transducer in a bulky water bag. Also, these initial ABT techniques require several minutes to collect sufficient ultrasonic echo data for accurate attenuation estimations. This time requirement is not very desirable for current medical diagnosis purposes. Thus, until the present invention, ABT techniques have not been adaptable to current ultrasonic imaging systems.

Several forms of ultrasonic scanning mechanisms have been suggested for use in performing ultrasonic diagnosis of human and animal organs. One principal form employs a rotating scanning head which carries a plurality of transducers. As the head rotates, the transducers sequentially pass by a body organ at which time they transmit signals into the organ and receive reflected echoes from the organ.

A second principal form of ultrasonic scanning mechanism employs an oscillating scanning head or "wobbler" which normally has a single transducer. As the head oscillates, the transducer oscillates through a scanned angle while transmitting and receiving ultrasonic signals.

In both the rotating and oscillating scanning mechanism, the scanning head may be mounted in a housing filled with an acoustic coupling liquid In some instances, the motor driving the head may be mounted directly in the same liquid-filled housing; in other instances, it may be mounted in a dry region outside the housing and coupled to the head through a suitable seal.

SUMMARY OF THE INVENTION

The method and apparatus of the present invention address the problems inherent in the prior art, including the bulky water bag and the slow data acquisition of the known ABT methods. The present invention provides a novel method and apparatus which allows concomitant imaging and rapid ABT measurements. The present invention also enables ABT to be adapted to current ultrasonic imaging systems.

The present invention comprises a method and apparatus for concomitant ultrasonic pan focal imaging and axial beam translation. The present invention employs an ultrasonic scanner which contains a plurality of matched transducer elements These elements are staggered on a mechanism which sequentially places each transducer opposite an acoustic window at axially spaced positions along a common ultrasonic radiation axis. Further, the mechanism may scan across the window so that the transducers may repeat this axial orientation along a plurality of such radiation axes which radiate through the same window. Thus, the invention comprises a system for scanning a region within a tissue or similar target body by tracking or stepping laterally across the target with an axial array of transducers which transmit and receive sonic signals to and from the target along a plurality of different radiation axes or sonic travel paths. The transducers are positioned on a movable mounting means or mechanism such that the transducers are axially spaced from one another along each said axis or sonic travel path. Normally, the transducers are not axially arrayed on the mechanism itself but instead are sequentially positioned or staggered along a common radiation axis or axes by movements of the mechanism. Hence, the transducers are considered for the purposes of the invention to be axially staggered.

Because of the axial staggering of the elements, sequential transducer scans may acquire echo data emanating from successively deeper or shallower regions in the target body corresponding to the stagger pattern. Each region being scanned is at a constant range from its respective transducer element. In this way, ABT is achieved and an extended or pan focal image may also be concomitantly acquired by appropriate range gating of the returned echoes for each respective transducer.

The apparatus and method of the present invention is a safe and non-invasive mechanism for the diagnosis of organic tissue. It allows tissue pathology to be detected without the need for biopsy and other surgical techniques.

Other objects and advantages and a more complete understanding of the invention may be obtained b referring to the following detailed description when taken in conjunction with the accompanying drawings.

BRIEF DESCRIPTION OF THE DRAWINGS

FIG. 6 is a block diagram of an ultrasonic diagnosis system according to one embodiment of the present invention.

DETAILED DESCRIPTION

Figure 1:
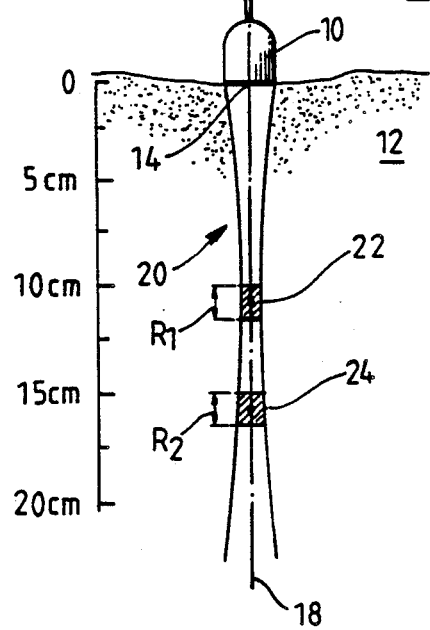
FIG. 1 is a schematic view useful for explaining variations in impulse response of a transducer to echoes originating at different points along its ultrasonic radiation axis.

The Axial Beam Translation ("ABT") method relies on the acquisition of echoes from varying depths in the target body, while maintaining a constant range from the transducer aperture. The ratio between the received (echo) and transmitted (pulse) of ultrasonic power for backscatter from an ensemble of scatterers in the far field of an ultrasound transducer can be expressed as:

$$\frac{P_r(R)}{P_0} = \frac{T^2 <\sigma_b> A^2 \exp(-4\alpha R)}{R^4 \lambda^2} \quad \text{(D1)}$$

The variable R is the distance from the transducer to the scatterers, $\lambda$ is the wavelength, assuming a fixed frequency, T is the efficiency of the transducer, A is the effective aperture of the transducer, $\alpha$ is the attenuation coefficient of the target body at frequency $Of = c/\lambda$ (where c is the speed of sound propagation in the target body), and $<\sigma_b>$ is the average backscatter cross section. If the medium between the transducers and the scatterers is composed of attenuating (tissue) and nonattenuating (water path) parts, then (D1) can be rewritten as:

$$\frac{P_r(R)}{P_0} = \frac{T^2 <\sigma_b> A^2 \exp(-4\alpha d)}{R^4 \lambda^2} \quad \text{(D2)}$$

In (D2) d=R−W is the portion of R for which α is non-zero, and W is the portion for which a is zero. Assuming that there are two scattering ensembles at ranges $R_1$ and $R_2$, respectively, having the same average value for $<\sigma b>$ and both within the attenuating target body (see FIG. 1, regions 22 and 24), then the ratio of the received ultrasound echo from both ranges is:

$$\frac{Pr(R_1)}{Pr(R_2)} = \exp\frac{[4\alpha(d_2 - d_1)]}{(R_1/R_2)^4} \quad (D3)$$

The variables $d_1$ and $d_2$ may be expressed as R−W and $R_2$−W respectively. The constant speed of sound in the water path mechanism is assumed to be the same as that of the target body (tissue). The wavelength of the ultrasound pulse is also assumed constant. The numerator of (D3) contains the desired attenuation information, whereas the denominator is a beam-spreading loss which causes artifacts in acquired echoes and results in bias errors in estimating the attenuation characteristics of the target body.

A reduction in the effect of beam-spreading loss can be achieved by performing attenuation measurements such that the acquisition of echo spectra is done in two steps (see FIG. 2): (1) echoes are acquired from a given range $R = R_1 = R_2$ first, and then (2) the transducer is translated along its radiation axis in a water path by a known amount ($d_2 - d_1$) and echoes are again acquired at the same range R from the transducer, but which emanate from a new depth in the target body. The preservation of the range reduces the beam-spreading loss. Thus, if $R_1$ and $R_2$ are equal, but $d_1$ and $d_2$ are not, then (D3) becomes:

$$\frac{Pr(d_1)}{Pr(d_2)} = \exp[4\alpha(d_2 - d_1)] \quad (D4)$$

The variable Pr is proportional to the square of the received echo converted to a voltage Vr. Solving (D4) for α in units of decibels ("dB") per centimeter ("cm"), yields:

$$\alpha(dB/cm) = 0.57 \frac{\log_{10}Vr(d_1) - \log_{10}Vr(d_2)}{d_2 - d_1} \quad (D5)$$

In (D5) the expression for α is independent of $<\sigma b>$, as long as it is assumed to remain constant. Also, (D5) is only valid for a single discrete frequency. This equation can be generalized for a wide band spectrum as:

$$\alpha(f)(dB/cm/MHz) = 0.57 \frac{\log_{10}Vr(f,d_1) - \log_{10}Vr(f,d_2)}{d_2 - d_1} \quad (D6)$$

The value of α(f) is the frequency slope of the attenuation coefficient, and Vr(f,$d_1$) and Vr(f,$d_2$) are the average spectra of the echoes at depths $d_1$ and $d_2$, respectively. Equation (D6) essentially describes the simplest form of the log-spectral difference method, but with the added important feature that bias errors due to beam-spreading loss are reduced by ABT.

The log-spectral difference method for measuring attenuation with a fixed transducer is exemplified in FIG. 1. The transducer 10 is shown acoustically coupled to an organic body 12. The ultrasonic beam 20 is shown propagating into the body 12 along its radiation axis 18. The ultrasonic echo sequence propagates along the radiation axis 18 opposite the ultrasonic beam toward the aperture 14 of transducer 10. Using known range gating techniques, the ultrasonic echo sequence is broken up into temporal windows which may correspond, for example, to regions 22 and 24 within body 12. Since ultrasound propagates through soft tissue at about 1540 meters per second, it will take ultrasound about 130 microseconds to go and return through 10 cm of tissue. Thus, a range gate set to receive echoes for a 130-156 microsecond temporal window will acquire echoes corresponding to region 22. A range gate set for 195-221 microseconds will acquire echoes corresponding to region 24. The echoes are converted to a series of spectra using known Fourier transform algorithms. See Roman Kuc, "Estimating Acoustic Attenuation from Reflected Ultrasonic Signals: Comparison of Spectral Shift and Spectral Difference Approaches," IEEE Transactions on Acoustics, Speech and Signal Processing, ASSP-32, 1-6, (1984). The log-spectral differences between each region may be computed and plotted or recorded as a function of frequency to derive the attenuation coefficient. However, the attenuation coefficient which is thereby derived will normally be subject to bias errors. Artifacts in the spectra calculated from echoes originating from regions at different distances from the transducer aperture 14 often result from beam-spreading loss, diffraction and/or interference effects. These variations in transducer pulse-echo impulse response as a function of distance from the aperture contaminate the spectra. The data from these spectra will subject attenuation estimations thereby derived to bias errors.

Figure 2:
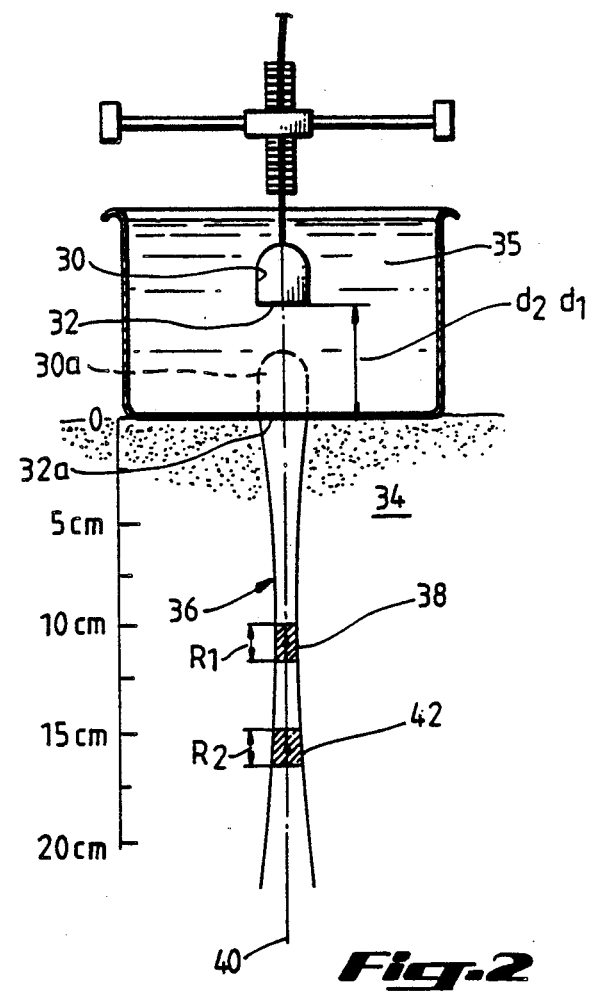
FIG. 2 is a schematic view useful for explaining the elimination of diffraction error in acoustic attenuation measurement using axial beam translation.

FIG. 2 exemplifies the use of ABT to reduce the bias errors in the attenuation estimation discussed above. Transducer 30 is shown disposed in water path 35 which is acoustically coupled to body 34. Echoes are acquired from region 38 in response to acoustic beam 36 using range gating techniques as set forth above. The transducer 30 is then translated along the radiation axis 40 to position 30a wherein echoes from region 42 are acquired. The distance between aperture 32 and region 38 is identical to the distance between the aperture at 32a and region 42. By keeping the distance between each transducer aperture and its respective region of interest constant during echo acquisition, the bias errors in the derived attenuation coefficient may be reduced.

The present invention utilizes ABT techniques to reduce bias errors in attenuation estimations without the need for a bulky water bag. According to the present invention, ABT may be conveniently performed by utilizing a plurality of matched transducers mounted on a scanning mechanism in an axial stagger pattern. As a result of the pattern, the mechanism will sequentially place each respective transducer across an acoustic window at axially different positions along one or more common axes.

Figure 3:
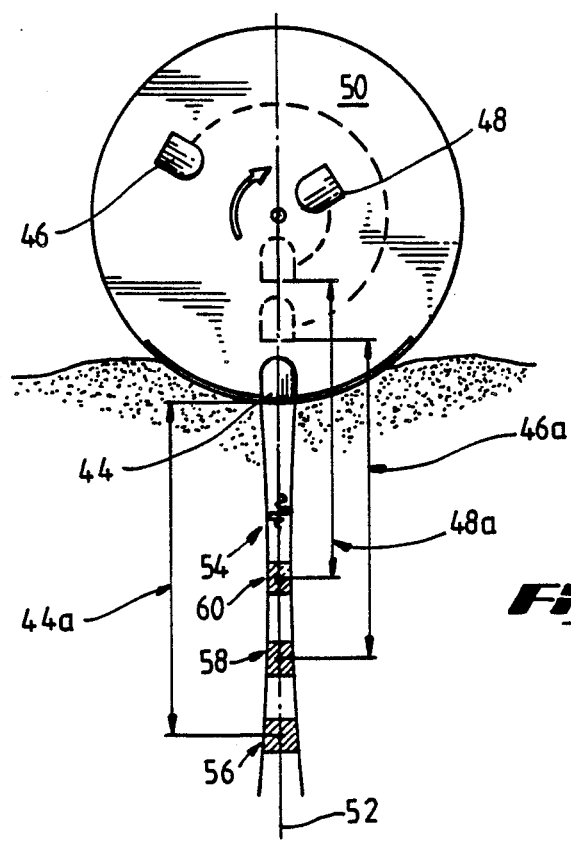
FIG. 3 is a schematic view useful for explaining an axial stagger pattern of matched transducers according to of the present invention.
Figure 1A:
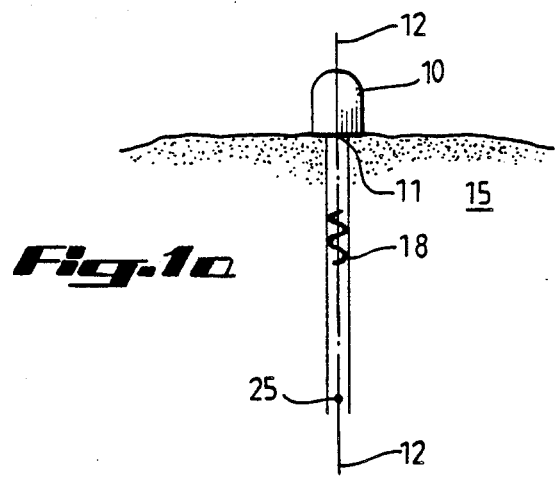
Figure 1B:
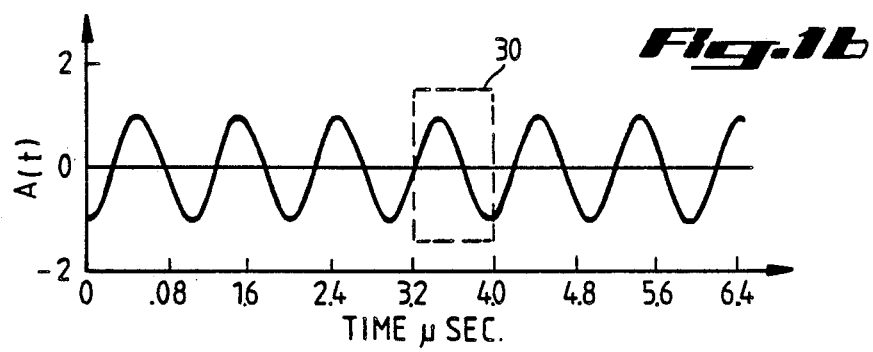
Figure 2A:
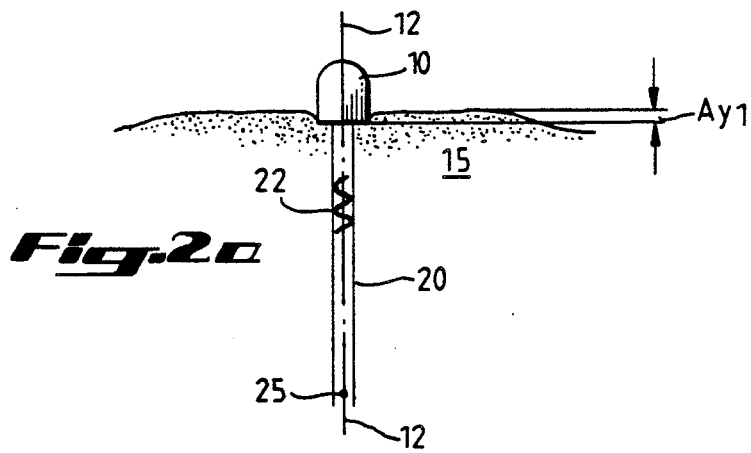
Figure 2B:
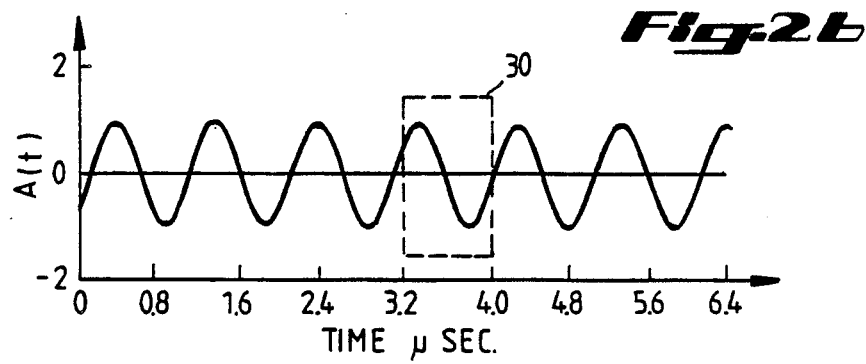

Conveniently, the present invention may employ a rotating scanning head which carries a plurality of transducers. As illustrated in FIG. 3, transducers 44, 46 and 48 are mounted on a rotor 50 and face radially outward in a spirally staggered pattern. As the rotor 50 turns, the transducers are sequentially positioned at different points along the axis 52 and thus become axially staggered. As each transducer sweeps past the axis 52, an ultrasonic pulse 54 is generated and echo spectra acquired for temporal windows corresponding to regions 56, 58 and 60. For example, transducer 44 is used to acquire echoes from region 56 along the ultrasonic radiation axis 52. As the scanner mechanism turns, transducer 48 is aligned at a separate point along the axis and acquires echoes from region 60. Similarly, transducer 46 is positioned at a unique point along axis 52 and acquires echoes from region 58. As will be appreciated from FIG. 3, the distances 44a, 46a, and 48a between the apertures of transducers 44, 46 and 48 and their respective regions are identical. In this way, the benefits of ABT are achieved, but without the necessity of a bulky water bag. By using matched transducers—i.e., transducers having substantially identical acoustical properties, the scanner of the present invention achieves the same results as a single transducer axially translated along a common axis in a water bag as in FIG. 2. It will also be appreciated that the speed and mechanization of the present invention solves the problem of slow data acquisition which is undesirable in clinical settings.

Figure 4:
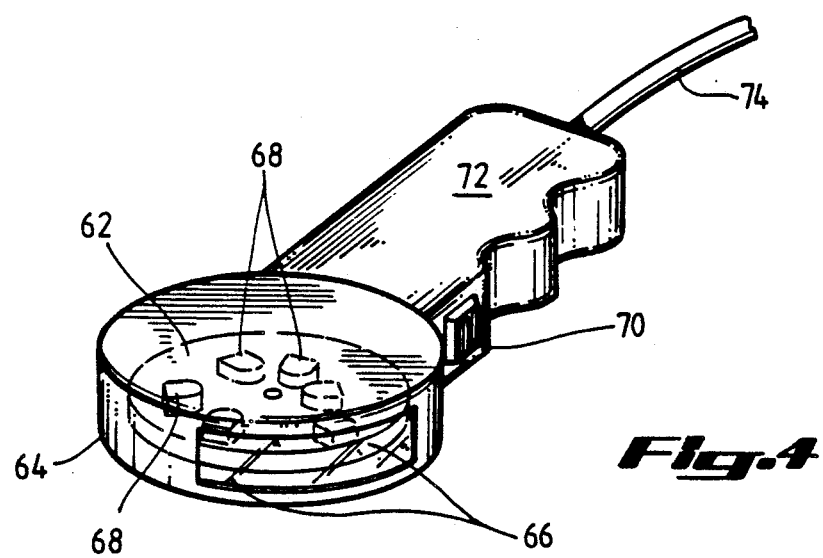
FIG. 4 is a perspective interior view of an ultrasonic scanner according to one apparatus embodiment of the present invention.

The present invention may advantageously perform ABT techniques with a scanner as shown in FIG. 4. The scanner comprises a disk 62 rotatably disposed in a sealed housing 64 which contains an acoustic window 66. The acoustic window is sound-permeable and may be constructed from a membrane of a high strength thermoplastic resin, such as a polycarbonate or the like. The housing is filled with an acoustic coupling fluid which is matched to the speed of sound and impedance of the target body. The disk 62 contains a plurality of spirally staggered and matched transducer elements 68. As the disk rotates, different transducers will scan the acoustic window 66 at axially different positions along one or more common axes. Because of the staggering of the transducers 68, sequential transducer sweeps will be operable to acquire echo signals from sequentially staggered regions within a target body. As will be apparent from FIG. 4 and FIG. 5, the regions may be staggered both axially and arcuately.

ABT may be achieved by appropriate range gating of the returned echoes such that only echoes returning from regions at a fixed distance from each respective transducer element are received. The range gate may be set, for example, to acquire echo signals corresponding to regions having a width of from about 1 cm to about 3 cm. These echoes may be used to generate an image or may be used to calculate the attenuation coefficient. The diameter of the scanner is usually somewhat larger than twice the depth of the body region of interest targeted for attenuation estimations. In clinical diagnosis, the body contact area may range from about 6 cm×2 cm to about 9 cm×2 cm, depending on the number of axially staggered transducers employed The apparatus may optionally contain a manual ABT switch 70 located in handle 72 of the scanning mechanism. This may allow the operator to obtain an anatomical image before activating the ABT mode. Electrical lead 74 may connect the scanner of FIG. 4 to an ultrasonic diagnosis system such as exemplified in FIG. 6.

The apparatus and method of the present invention require a plurality of axially staggered and matched transducers to achieve the advantages of quick, accurate add non-problematic attenuation measurements. Optionally, additional unstaggered transducer elements may be included for conventional imaging only. The invention contemplates transducers which may be piezoelectric, ferroelectric or magnetostrictive in nature The present invention is not limited by the size, focusing properties or band width of the transducer elements to be employed.

In general a focused transducer has an ultrasonic beam which in a certain range is constricted or narrower in diameter than the fixed diameter beam generated by a non-focused transducer. The range from the transducer aperture at which a focused beam is constricted is known as the working range of the transducer. Outside that range the focused beam is more divergent than an unfocused beam. In one embodiment of the present invention, a plurality of focused transducers may be used. Sequential transducer sweeps across the acoustic window then have sequentially staggered focal lengths By accepting signals only from the focal (working) range of each transducer element, and combining the images so obtained, ABT may be achieved and high resolution imaging in the extended focus may also be simultaneously done. However, the present invention contemplates the use of either focused or unfocused transducers.

The apparatus and method of the present invention are not limited to a particular algorithm for calculating the attenuation characteristics of a target body. The present invention optionally contemplates using a combination of ABT and IDF algorithms to further correct echo spectra obtained during attenuation measurements. For a review of IDF algorithms and techniques, see Cardoso, et al., "Diffraction Correction in Pulse Echo Attenuation Measurement", IEEE Ultrasonics Symp. Proc. 841-846, (IEEE Cat. No. 83, Ch. 1947-1, 1983); Cloostermans, et al., "A Beam Corrected Estimation of the Frequency Dependent Attenuation of Biological Tissues from Backscattered Ultrasound", Ultrasonic Imaging, Vol. 5, 136-147 (1983); and Insana, et al., "Improvements in the Spectral Difference Method for Measuring Ultrasonic Attenuation", Ultrasonic Imaging, Vol. 5, 331-345 (1983), which are incorporated by reference herein.

For a further review of algorithms used in attenuation characterization, see Leeman et al., "Perspectives on Attenuation Estimation from Pulse-Echo Signals," IEEE Transactions on Sonics and Ultrasonics, Vol. SU-31, No. 4, 352-361 (1984) and Garra, et al., "In Vivo Attenuation Measurement Method and Clinical Relevance," Proc 6th European Communities Workshop, 87-100 (1988), which are incorporated by reference herein.

Although the apparatus and method of this invention are typically described in relation to clinical diagnosis, this should be understood not to be a limiting factor on the utility of the invention. To the contrary, the present invention has utility in any area in which the attenuation characteristics of a target body may be desired. For example, the present invention may be used in forensics, tissue characterization studies, veterinary medicine, laboratory experiments or measuring the properties of any material which exhibits acoustic attenuation and scattering of ultrasonic energy.

Figure 5:
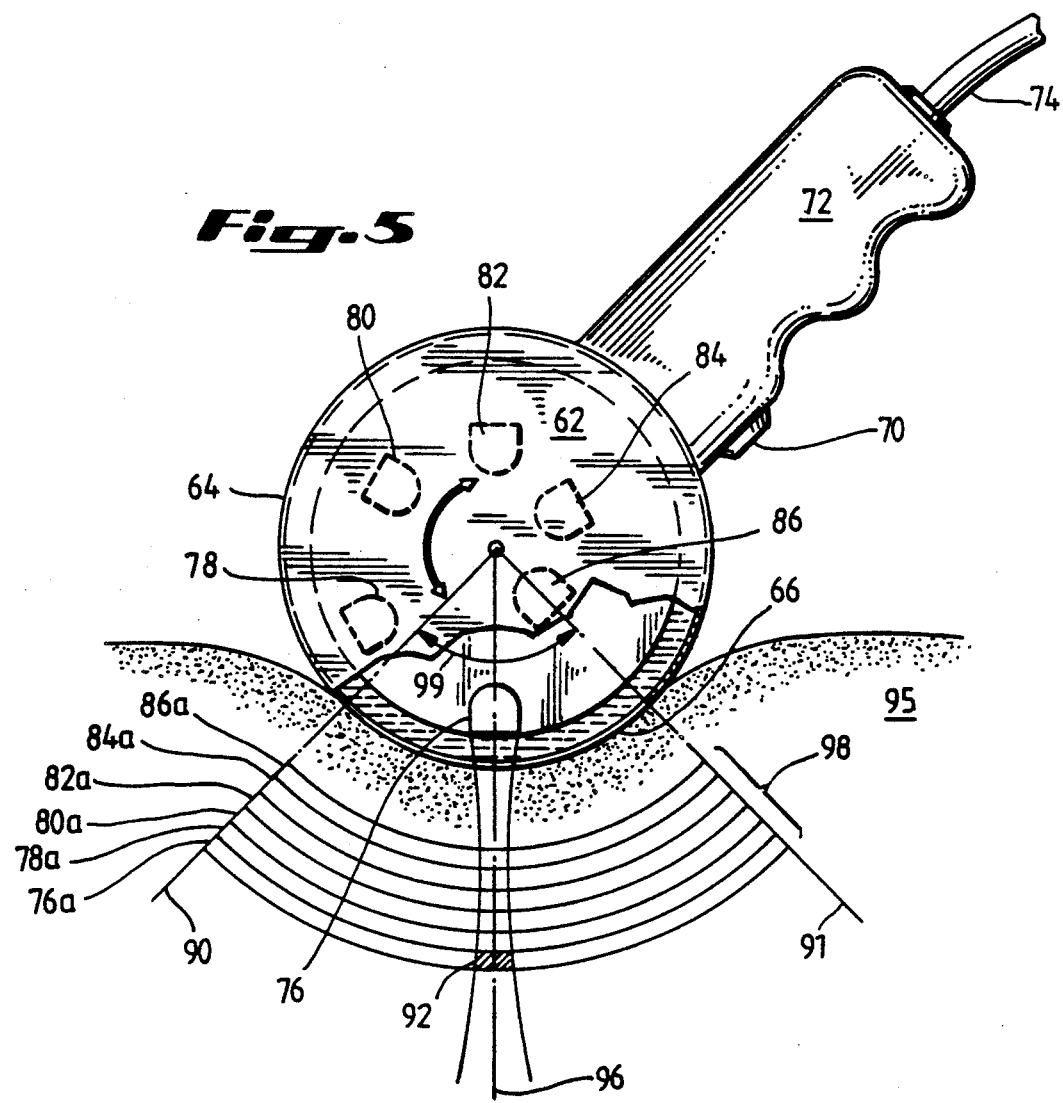
FIG. 5 is a schematic interior view of the ultrasonic scanner of FIG. 4 shown acoustically coupled to a target body.

As schematically shown in FIGS. 4 and 5, an ultrasonic scanner having six axially staggered transducer elements 76, 78, 80, 82, 84 and 86 is acoustically coupled to a target body 95. The extended focus sector 98 of the body 95 having boundaries 90 and 91 is diagnosed as the transducers sequentially sweep acoustic window 66. The extended focus sector 98 comprises six range gated strips 76a, 78a, 80a, 82a, 84a and 86a which correspond to the six axially staggered transducer elements The sector angle 99 may be determined by the number of transducer elements. For example, six transducer elements allow a $2\pi/6$ or $\pi/3$ sector angle 99. The range gated strips 76a et seq. consist of a series of range gated regions such as 92. The number and location of these regions corresponds to the number of axes along which a transducer is pulsed as it sweeps the acoustic window. The number of times a transducer is pulsed corresponds to the radial scan line or a-line density. An a-line is the echo sequence corresponding to an ultrasound pulse as it propagates along a fixed axis through the target 95. The desired a-line density is based on considerations of adequate imaging and depth of penetration, and may be, for example, 170 a-lines per $\pi/3$ sector angle 99 for a depth of penetration of 20 centimeters. These figures, combined with the average speed of sound in tissue of 1540 meters per second, result in a sweep time per $\pi/3$ sector angle 99 of 45 milliseconds, or about 0.27 seconds for one revolution of disk 62. This allows a frame rate of approximately four frames per second This frame rate, combined with hand-held contact scanning allows convenient imaging and attenuation estimation with ABT.

Continuing in FIG. 5, as transducer 76 sweeps acoustic window 66, it is activated approximately 170 times along 170 axes and acquires echoes corresponding to 170 regions (temporal windows) to form strip 76a. For example, an acoustic pulse will propagate within a particular beam having an axis 96. An echo signal which corresponds to region 92 is acquired from the a-line propagating along axis 96 using a range gate. As each successive transducer sweeps the acoustic window, each will be pulsed along the same axes, including 96, and acquire echo signals from its respective range gated strip, including 76a et. seq. The data from the acquired signals may be combined to generate an extended focus image or may be used for attenuation estimations. Because of the transducer stagger pattern, each range gated strip is at a constant distance from its respective transducer aperture.

By acquiring approximately 170 echo sequences (a-lines) from the extended focus sector 98, the apparatus of FIG. 5 may obtain good quality images However, in order to obtain a good measurement of the attenuation characteristics, the echo sequences used are advantageously "uncorrelated" A "correlated" a-line represents a non-statistically independent echo sequence. For example, at a range of 100 millimeters, 170 echo sequences across the $\pi/3$ sector angle correspond roughly to two a-lines per millimeter, and thus would be considered highly "correlated". This means that about only 1 out of 10 echo sequences should typically be used for attenuation estimation, or about 17 echo sequences per frame.

Typically, about 250 independent echo sequences may be acquired for an attenuation estimation. Conveniently, the a-lines may be acquired from multiple "uncorrelated" planes or frames. Therefore, the use of the scanning head in vivo may involve rocking the scanner from side to side over an angle of $\pi/4$ or so, and acquiring data from about 10 "uncorrelated" frames. If the device generates approximately 4 frames per second, rocking of the transducer will be accomplished in about 2.5 seconds. During the first frame, all 170 echo sequences (each comprising 6 segments acquired by the axially staggered transducers) may be digitized at a 25 MHz sampling rate and stored in half of the data acquisition system 116 in FIG. 6. During the second frame the echo sequences may be stored in the other half of the data acquisition system 116, while the data from the first frame is transferred to the computer 130.

Referring to FIG. 6, a representative block diagram of a system implementing the present invention is exemplified. The ABT scanning head 100 is driven by a 1024 step/revolution stepper motor 106, whose speed is controlled by a precision 3.9 KHz pulse repetition frequency ("PRF") clock 102, derived from a higher frequency 2 MHz master clock 104. An optical shaft encoder 108 is connected to the stepper motor 106 and provides absolute shaft angle information with 11 bit accuracy. The three most significant bits may serve as sector identifiers. The remaining bits may be used to code the individual echo sequences or a-lines. As the scanning head turns, the transducer multiplexer 110 sequentially selects one of the six transducers which is to be driven by the transmitter 112. Both the transmitter and the time-gain-compensation ("TGC") circuit 114 are driven from the 3.9 KHz PRF clock 102. The TGC or depth-compensation circuit amplifies echo signals in proportion to their transit time to compensate for signal attenuation. This allows for improved images on the display 118 and complete digitization of signals when fed into the data acquisition and storage system 116. A range gate 120 provides a write-enable signal to the digital scan converter ("DSC") 122 which allows pixels to be modulated on the display 118 corresponding to their respective range gated strips. The signal intended for imaging is fed into the demodulator 124 and then fed to the DSC 122. Position signals to the DSC 122 are provided by a dual x-y programmable-read-only-memory ("PROM") 126 which is strobed by the 2 MHz clock 104. The PROM generates a sequence of pre-programmed x-y addresses at a rate of 2 MHz. These addresses are converted to analog (position) signals and fed to the DSC 122. The DSC may operate in gated survey mode, such that individual sequential range gated strips in the image are updated, corresponding to the transducer with the appropriate focal distance which is swept across the acoustic window.

The ABT section of the exemplified apparatus involves eight bit digitization of the radio frequency ("RF") signal at 25–50 MHz via a data acquisition and storage system 116, and the TGC voltage at 25–50 KHz. These signals are later combined in software to calculate the absolute magnitude of the echo spectra. The output of the analog-digital converter 128 is communicated to the microcomputer 130 through the IEEE-488 bus 132. Using a six transducer scanner, the software for computing the attenuation coefficient may comprise, for example, the following steps:

1. Acquire 170 a-lines and divide into 6 segments (range gated strips) corresponding to 6 depths of observation within the target body;

2. Compute the average power spectrum for each depth by averaging the squared fast Fourier transform for all echoes in each segment over all a-lines;

3. Perform spectral smoothing by windowing the autocorrelation function of the averaged spectra obtained in step 2 above and re Fourier transforming to obtain a smoothed power spectrum;

4. Convert the power spectra of step 3 to units of dB (log of power spectrum);

5. Perform linear regression with respect to each depth of observation for all frequencies in the ultrasonic pulse (wideband) to obtain an attenuation-with-frequency curve;

6. Determine the best frequency band within the band width of frequencies in step 5 to obtain a linear fit with respect to frequency;

7. Optimize the data from step 6 to obtain the frequency band width that provides the best linear regression with frequency using a standard deviation parameter; and 8. Compute the attenuation coefficient Although the invention has been described with a certain degree of particularity, it is to be understood that the above description has been only by way of example. Numerous other changes will be apparent to those reading the specification without departing from the spirit and scope of the invention as claimed

What is claimed is:

1. Apparatus for tissue characterization measurement of a target body comprising:
   (a) a plurality of matched ultrasonic transducers;
   (b) a moveable mounting member adapted to mount the transducers in a spaced array such that movement of the mounting member sequentially positions the transducers in an axially staggered pattern along one or more common ultrasonic radiation axes to transmit and receive ultrasonic signals to and from the target body along the one or more common ultrasonic radiation axes up, and
   (c) means coupled to said matched transducers for performing tissue characterization measurements using said received ultrasonic signals.

2. The apparatus of claim 1 wherein said mounting member sequentially positions the transducers along a plurality of common ultrasonic radiation axes.

3. The apparatus of claim 2 comprising four to six matched transducers.

4. Apparatus for ultrasonic tissue characterization measurement of a target body comprising:
   (a) a plurality of matched ultrasonic transducers, each of said transducers having an ultrasonic aperture;
   (b) a moveable mounting member adapted to mount the transducers in a spaced array such that movement of the mounting member sequentially positions the transducers in an axially staggered pattern along one or more common ultrasonic radiation axes to transmit ultrasonic signals to the target body along the one or more common ultrasonic radiation axes;
   (c) a range gate operable to detect a separate ultrasonic echo signal originating from said target body in response to each transmitted signal wherein: (1) the detected echo signals emanate from regions within the target body which are axially staggered along said radiation axes in a relation corresponding to the axial stagger pattern of the transducers along said axes; and (2) the distances between each of said regions and the ultrasonic apertures of their respective transducers are about equal.
   (d) means coupled to said matched transducers for performing tissue characterization measurements using said received ultrasonic signals.

5. The apparatus of claim 2 wherein said mounting member sequentially positions the transducers along a plurality of common ultrasonic radiation axes.

6. The apparatus of claim 5 comprising four to six matched transducers.

7. Apparatus for ultrasonic characterization measurement of a target body comprising:
   (a) a sealed housing adapted to contain an acoustic coupling fluid and having an acoustically transparent window disposed on the periphery;
   (b) a disk disposed inside said housing and rotatably coupled to the housing;
   (c) a plurality of matched transducers mounted to face radially outward on the disk in a spirally staggered pattern such that rotation of the disk separately and sequentially places said transducers across said window at axially spaced positions along one or more common ultrasonic radiation axes and
   (d) means coupled to said matched transducers for performing tissue characterization measurement.

8. The apparatus of claim 7 comprising 4 to 6 matched transducers.

9. The apparatus of claim 8 wherein said transducers are focused transducers.

10. The apparatus of claim 5 wherein said mounting member sequentially positions the transducers along a plurality of common ultrasonic radiation axes.

11. An apparatus for ultrasonic analysis of a target body comprising:
    (a) a housing adapted to make contact with said body and to contain an acoustic coupling fluid;
    (b) a mounting member mounted within the housing in rotatable relation thereto such that rotation of the mounting member causes points along the periphery of the mounting member to travel past the portion of the housing which makes contact with said target body;
    c) a plurality of matched ultrasonic transducers mounted on the mounting member in a pattern such that movement of the mounting member separately and sequentially positions each transducer adjacent the contact between the housing and the body and spaced along a common ultrasonic radiation axis extending through the contact into the body; and
    (d) circuitry operable to separately activate each transducer when adjacent said contact so as to (1) transmit ultrasonic energy into the body and thereafter; (2) receive a reflection of said energy from a region within the body such that the travel times of the energy between the transducers and their respective reflective regions within the body are about equal.

12. The apparatus of claim 11 wherein the transducers are mounted in a spiral pattern on the moveable member 13. The apparatus of claim 6 which further comprises an acoustic window located in the portion of the housing which is adapted to contact the body.

14. A method of performing an ultrasonic characterization measurement of a target body using a plurality of ultrasonic transducers which comprises:
    (a) sonically coupling a first ultrasonic transducer to a target body to transmit and receive ultrasonic signals to and from the body along a radiation axis;
    (b) transmitting an ultrasonic signal from the first transducer along said radiation axis into the body;
    (c) detecting reflection signals of the transmitted signal reflected from the body during a selected time interval following the transmission of the transmitted signal;
    (d) decoupling and moving the first ultrasonic transducer away from its position on said radiation axis;
    (e) moving a second transducer on to said radiation axis at a position axially spaced from the position occupied by the first transducer;
    (f) repeating steps (a) through (d) for the second transducer;

(g) coordinating said transmissions and detections such that the signal travel times between transmission and detection for the two transducers are about equal. and (h) performing characterization measurements based upon said detected reflection signals.

15. A method of obtaining ultrasonic echo data from a target body for tissue characterization measurement which comprises:
  (a) sequentially coupling and transmitting a separate pulse of ultrasonic energy into a target body from each one of a plurality of matched ultrasonic transducers which are sequentially placed in, and energized to transmit their respective pulses from, axially staggered positions along a common pulse transmission axis;
  (b) detecting a separate echo signal from the target body for each transmitted pulse such that the echo signals emanate from regions within the tissue which are axially staggered along said pulse transmission axis in a relation corresponding to the axial stagger of their respective transducers along said pulse transmission axis and (c) performing characterization measurements based upon said detected echo signals.

16. The method of claim 15 comprising 4 to 6 matched ultrasonic transducers.

17. The method of claim 15, which further comprises performing steps (a) and (b) along a plurality of spaced transmission axes.

18. The method of claim 11, wherein said characterization measurement performing step comprises obtaining the attenuation coefficient of the target body by the log spectral difference method.

19. The method of claim 18 in which adjacent said axes are spaced sufficiently from each other to be non-correlatable.

* * * * *

UNITED STATES PATENT AND TRADEMARK OFFICE
CERTIFICATE OF CORRECTION

PATENT NO. : 4,993,416
DATED : Feb. 19, 1991
INVENTOR(S) : Jonathan Ophir

It is certified that error appears in the above-identified patent and that said Letters Patent is hereby corrected as shown below:

Column 11, line 13, before "tissue" insert --ultrasonic--.

Signed and Sealed this

Fifteenth Day of December, 1992

Attest:

DOUGLAS B. COMER

*Attesting Officer*  *Acting Commissioner of Patents and Trademarks*